(12) United States Patent
Nilsson

(10) Patent No.: US 7,631,924 B2
(45) Date of Patent: Dec. 15, 2009

(54) CRASH BOX FOR A VEHICLE

(75) Inventor: Johan Nilsson, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 288 days.

(21) Appl. No.: 11/628,589

(22) PCT Filed: May 27, 2005

(86) PCT No.: PCT/SE2005/000794

§ 371 (c)(1),
(2), (4) Date: Dec. 4, 2006

(87) PCT Pub. No.: WO2005/120903

PCT Pub. Date: Dec. 22, 2005

(65) Prior Publication Data

US 2008/0030031 A1   Feb. 7, 2008

(30) Foreign Application Priority Data

Jun. 9, 2004   (SE) .................................... 0401460

(51) Int. Cl.
*B60R 19/34* (2006.01)
(52) U.S. Cl. ..................................... 296/133
(58) Field of Classification Search ................. 293/132, 293/133, 154, 155; 188/371, 377
See application file for complete search history.

(56) References Cited

U.S. PATENT DOCUMENTS

| 3,840,052 | A | * | 10/1974 | Schmidt | 138/96 T |
| 4,190,276 | A | * | 2/1980 | Hirano et al. | 293/133 |
| 4,272,114 | A | * | 6/1981 | Hirano et al. | 293/133 |
| 5,033,593 | A | * | 7/1991 | Kazuhito | 188/377 |
| 5,542,365 | A | * | 8/1996 | Jurisich et al. | 114/65 R |
| 6,174,009 | B1 | | 1/2001 | McKeon | |
| 6,406,081 | B1 | | 6/2002 | Mahfet et al. | |
| 6,672,438 | B2 | * | 1/2004 | Beck | 188/377 |
| 6,863,321 | B2 | * | 3/2005 | Jonsson et al. | 293/102 |
| 6,926,327 | B2 | * | 8/2005 | Shibata | 293/155 |

FOREIGN PATENT DOCUMENTS

| DE | 10014469 | 10/2001 |
| EP | 0856681 | 8/1998 |
| WO | 0238418 | 5/2002 |

* cited by examiner

*Primary Examiner*—Kiran B. Patel
(74) *Attorney, Agent, or Firm*—Mark P. Stone

(57) ABSTRACT

A crash box for fastening a bumper beam on a vehicle, for example a passenger car, has a closed cross section. Its perimeter has at least two longitudinal portions (19, 21), and each of them has a concave portion (20) that passes into convex portions (19, 21) at both sides. The smallest distance from the centre (40) of the crash box to the concave portion is less than 12% shorter than the largest distance from this centre to any one of the adjacent convex portions.

4 Claims, 3 Drawing Sheets

CRASH BOX FOR A VEHICLE

TECHNICAL FIELD OF THE INVENTION

This invention relates to a crash box with a closed cross section for fastening a bumper beam on a vehicle, wherein the perimeter of the crash box has at least two longitudinal portions with, in cross section, both a concave and a convex periphery portion,

DESCRIPTION OF PRIOR ART

It is known in the art to fasten bumper beams in crash boxes for example by EP-0763448 A1, DE-19537186 A1, DE-4127381 A1 and U.S. Pat. No. 3,998,485 A1. The crash boxes take up energy in a crash by being plastically deformed axially.

OBJECT OF INVENTION AND BRIEF DESCRIPTION OF THE INVENTION

It is an object of the invention to improve the deformation properties of a crash box so that the crash box will be able to take up more energy during its plastic deformation and also to stand higher forces before its plastic deformation begins as compared to other crash boxes having the same weight. This is achieved principally in that the concave portions of said longitudinal portions at both sides passes into convex portions, and the smallest distance from the centre of the cross section of the crash box to the concave portion is less than 12% shorter than the largest distance from this centre to any one of the adjacent convex portions. Suitably, each crash box has a polygonal cross section where at least two of the corners consist of two convex portions and an intermediate concave portion.

DESCRIPTION IN DETAIL OF THE ILLUSTRATED EMBODIMENTS OF CRASH BOXES IN ACCORDANCE WITH THE INVENTION, SHOWN AS EXAMPLES OF THE INVENTION

Figure 3:
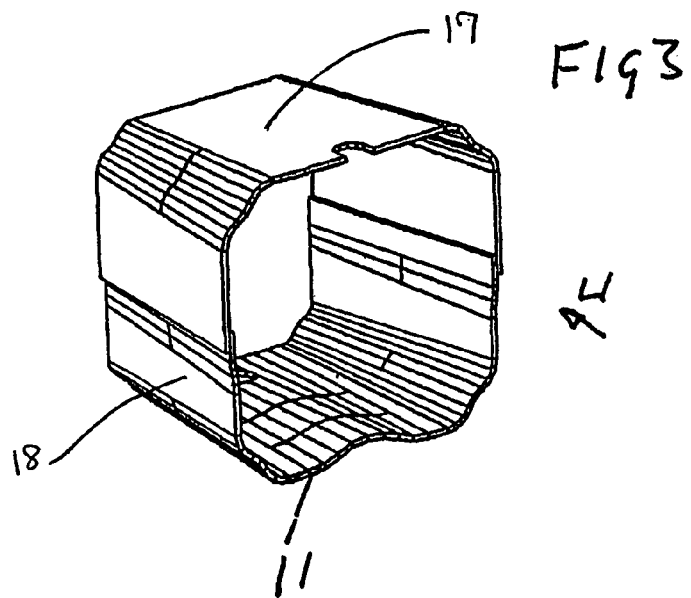
FIG. 3 shows, in a perspective view, the crash box of FIG. 1 without its fastening plates.
Figure 4:
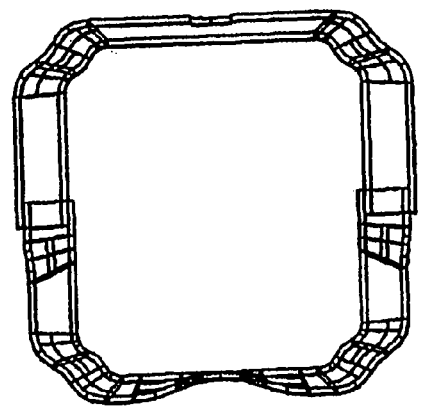
FIG. 4 is an end view seen as indicated by the arrow 4 in FIG. 3.
Figure 5:
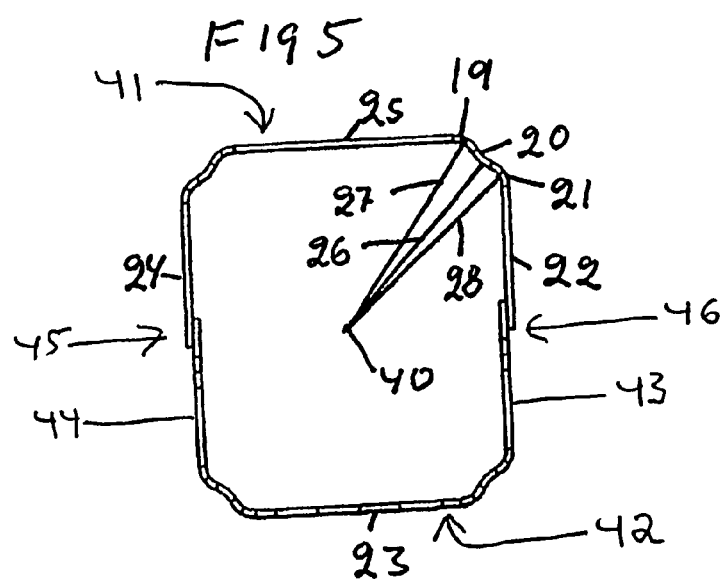
FIG. 5 is a cross section at the small end of the crash box shown in the FIGS. 1-4.
Figure 6:
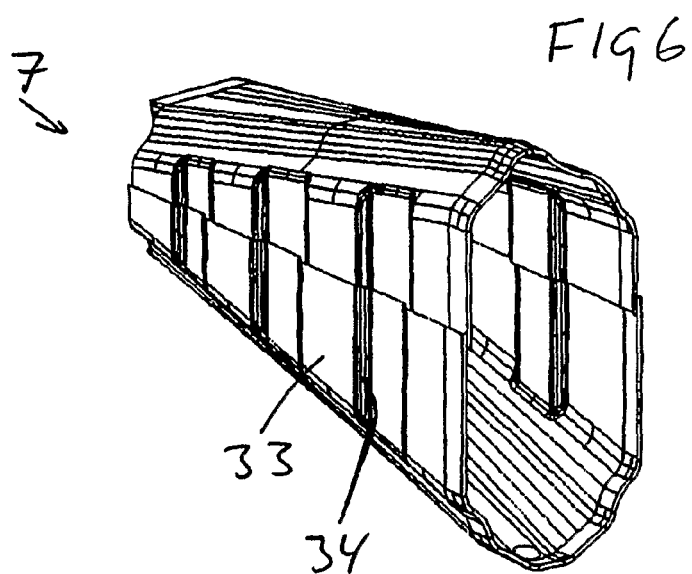
FIG. 6 shows, in a perspective view, the crash box shown in FIG. 2 without its fastening plate.
Figure 7:
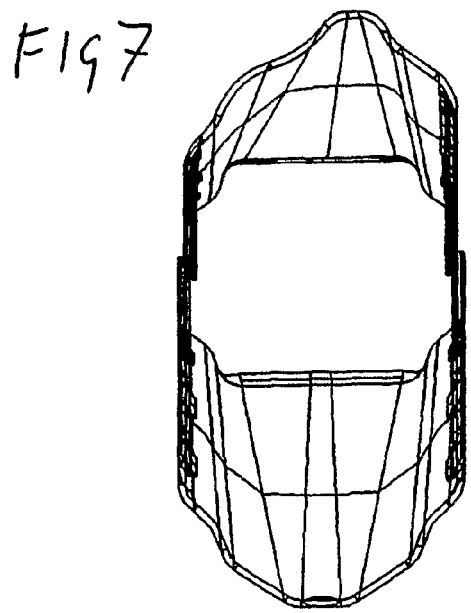
FIG. 7 is an end view seen as indicated by the arrow 7 in FIG. 6.

The crash box shown in the FIGS. 1, 3, 4 and 5 consists of a tube-formed energy absorbing member in the form of a cylinder that tapers or frustum 11 of sheet steel, which has a substantially rectangular cross section and has its big end welded to bent edges 12 of a fastening plate 13. A fastening plate 14 is welded to the other end and a rear bumper beam 15 is welded to this fastening plate 14. The big fastening plate 13 has holes 16 for screws so that it can be fastened to a supporting portion of the vehicle, usually to an end plate of one of the rear side rails of the vehicle. Only a short length of the bumper beam 15 is shown. The bumper beam is fastened to two similar crash boxes, each fastened to a side rail. FIG. 3 shows the frustum 12 without the other members of the crash box and FIG. 5 shows the cross section of the frustum close to its small end. The frustum 11 consists of an upper plate 17 and a lower plate 18, which are cold formed and overlapping and welded together. Each corner consists of two convex portions 19, 21 and an intermediate concave portion 20. The convex and concave portions pass directly into each other. Between these longitudinal portions that form the corners, the box has sides 22-25, which all are flat in the cross section shown in FIG. 5. In cross section, the sides 22, 24, 25 are straight along the entire length of the box whereas the side 23 gradually bulges inwardly. This bulging has no significance but is only an adaptation to the actual vehicle. Principally, the entire box has a polygonal cross section with corners that bulges inwardly. In FIG. 5, the shortest distance between the centre point 40 of the cross section of the box to the concave portion 20 is marked as line 26. The lines 27, 28 show the longest distances from the centre point 40 to the adjacent convex portions 19, 21. The shortest distance 26 shall be less than 12% shorter than the two longest distances 27, 27 and preferably less than 10% shorter.

As best illustrated by FIG. 5, the crash box is formed from an upper U-shaped profile designated by reference numeral 41, in which the side 25 forms a central flange, and the sides 22 and 24 form webs extending from the central flange 25. Similarly, a lower U-shaped profile is designated by reference numeral 42. The side 23 forms a central flange of the lower profile 42, and sides 43 and 44 form webs extending from the central flange 23. The upper profile 41 is fastened to the lower profile 42 such that the webs 22, 43 and the webs 24, 44, partially overlap at areas designated by reference numerals 45, 46, respectively.

The big end 11 of the frustum should be adapted to the cross section of the rear side rail. Since each corner consists of two convex portions and an intermediate concave portion, each corner will be able to take more load, and the increased cold working will result in a deformation hardening that also increases the capability to take up load before the plastic deformation begin when a crash load occurs. It has been experienced that the energy absorption will also be improved in the subsequent plastic deformation as compared to the energy absorption of a crash box with simple corners.

Figure 1:
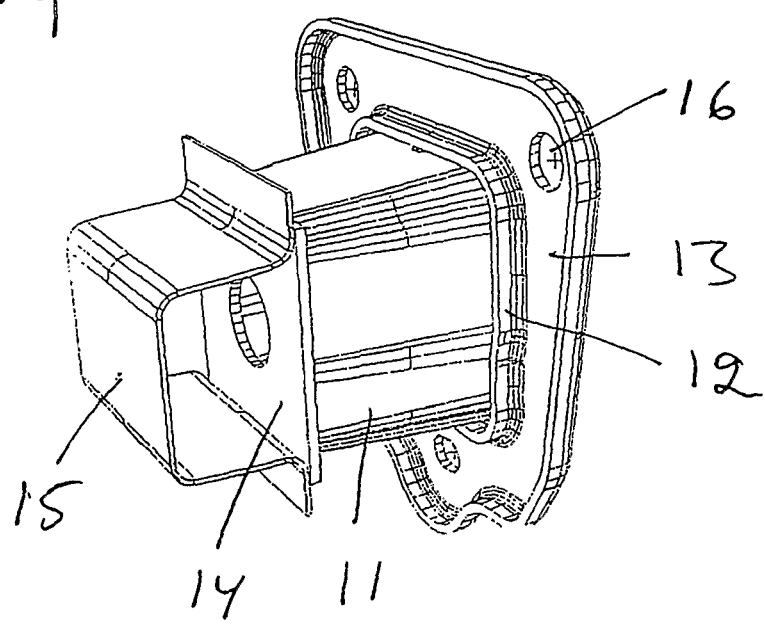
FIG. 1 shows, in a computer drawn perspective view, a crash box and part of a rear bumper.
Figure 2:
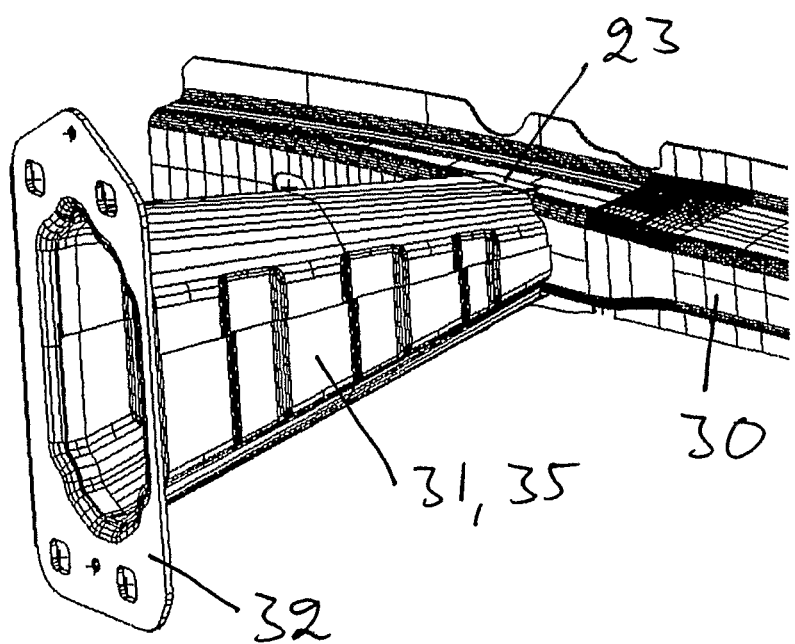
FIG. 2 shows, in a computer drawn perspective view, a crash box united with a front bumper.
Figure 8:
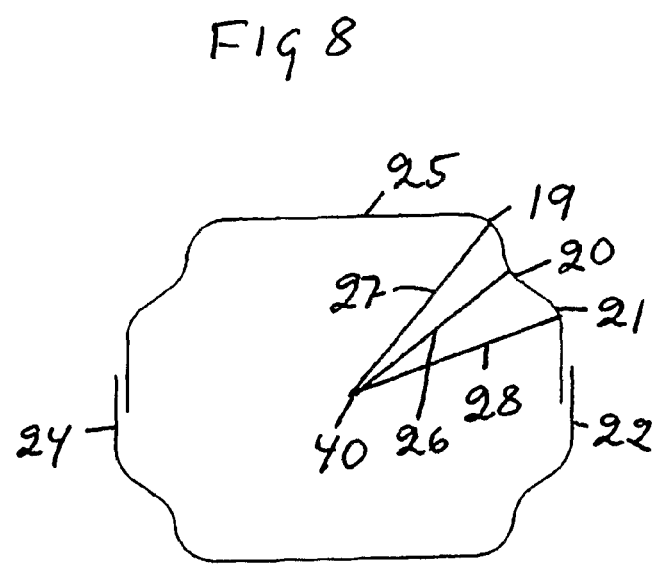
FIG. 8 is a transverse section at the small end of the crash box shown in the FIGS. 5-7.

FIG. 2 shows part of a front bumper 30 that is fastened to a crash box 31. The front bumper and its crash boxes are dimensioned for higher load than the rear bumper and its crash boxes and the crash box 31 is therefore both longer and sturdier. It has a fastening plate 32 for fastening to an end plate of one of the side rails of the vehicle. Its small end has two flaps of which only the upper one 33 is shown in FIG. 2, and the bumper beam is welded to these flaps. In this case, the bumper beam has a hat profile with its crown facing towards the automotive vehicle, for example a passenger car, whereas the rear bumper beam shown in FIG. 1 has a hat profile with its crown facing outwards. Also in the crash box according to FIG. 2, the energy absorbing tube-formed member 35 tapers and it is arranged in the longitudinal direction of the vehicle and carries the bumper beam by its small end. FIG. 8 shows its rectangular cross section at its small end. This cross section is similar to the corresponding cross section of the crash box shown in FIGS. 1, 3, 4 and 5, and its corners have in the same way two convex portions 19, 21 and intermediate concave portion 20. The cross section changes along the length and passes continuously into the cross section of the big end, which is adapted to the front side rail of the vehicle so that crash forces will be transmitted to the side rail with a minimum load on the fastening plate 32 and the corresponding fastening end plate of the side rail. Dents 34 form deformation triggers for controlling the deformation. In FIG. 8, lines 26, 27, 28 and the centre point 40 have been the cross section need not have marked out in a similar way as in figure 5. In the illustrated embodiment examples, the corners maintain their convex and concave portions along their entire length, but embodiments are also possiple in which the concave portions do not extend all the way. In certain cases, one wants to control the deformation behaviour by not having concave portions in all the corners. According to the invention, the cross section shall have at least two concave portions and the cross section need to have defined corners of the kind shown in figure 5.

The embodiment examples are made of cold forming steel, preferably having a tensile strength of more than 400 MPa (400 N mm$^2$), and the crash boxes are formed by cold bending. Short crash boxes of the kind shown in FIG. 1 may alternatively be formed by deep drawing, and flanges and a bottom thereof may be integrally formed.

In the illustrated embodiment examples, various members has been described as united by welding. However, this is not a limitation but alternative methods may be used.

The invention claimed is:

1. A crash box for fastening a bumper to a vehicle, said crash box comprising:
   an upper U-shaped profile having a central flange and two webs, and corners between the central flange and the webs; and
   a lower U-shaped profile having a central flange and two webs, and corners between the central flange and the webs;
   the webs of said upper and lower U-shaped profiles being fastened together in overlapping pairs to form a closed profile of the crash box;
   each said corner of said crash box comprising two convex portions and an intermediate concave portion disposed between said two convex portions.

2. A crash box according to claim 1, wherein the smallest distance from the center (40) of the cross section of the crash box to the concave portion of one said corner is less than 12% shorter than the largest distance from said center to any one of said convex portions adjacent to said concave portion of said one corner.

3. A crash box according to claim 2, wherein said smallest distance is less than 10% shorter than the largest distance from said center to any one of said convex portions adjacent to said concave portion of said one corner.

4. A crash box according to claim 1, wherein said upper U-shaped profile and said lower U-shaped profile are cold-formed in high-strength sheet steel that has an initial tensile strength of at least 400 N/mm$^2$.

* * * * *